United States Patent [19]
Janiak

[11] 3,810,988
[45] May 14, 1974

[54] CONTROL OF PHYTOPATHOGENIC FUNGI WITH N-BENZOTHIAZAE-2-YL N-' PROPYLURE

[75] Inventor: Stefan Janiak, Basel, Switzerland

[73] Assignee: Ciba-Geigy AG, Basel, Switzerland

[22] Filed: Feb. 12, 1973

[21] Appl. No.: 331,721

Related U.S. Application Data

[62] Division of Ser. No. 868,589, Oct. 22, 1969, Pat. No. 3,725,428.

[30] Foreign Application Priority Data
Nov. 1, 1968    Switzerland................. 16333/68

[52] U.S. Cl. ................................... 424/270
[51] Int. Cl. ........................ A01n 9/12, A01n 9/22
[58] Field of Search .......................... 424/270

[56] References Cited
UNITED STATES PATENTS
2,756,135  7/1956   Searle .................. 260/305
3,551,441  12/1970  Zakaria ................ 260/305

Primary Examiner—Albert T. Meyers
Assistant Examiner—Allen J. Robinson
Attorney, Agent, or Firm—Frederick H. Rabin

[57] ABSTRACT

Phytopathogenic fungi are controlled by the use of compounds of the formula

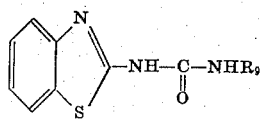

in which $R_9$ is $C_3$ alkyl.

4 Claims, No Drawings

CONTROL OF PHYTOPATHOGENIC FUNGI WITH N-BENZOTHIAZAE-2-YL N-' PROPYLURE

This is a division of application Ser. No. 868,589, filed on Oct. 22, 1969, now U.S. Pat. No. 3,725,428.

The present invention provides microbiocidal agents which comprise, as the active ingredient, a compound of general formula

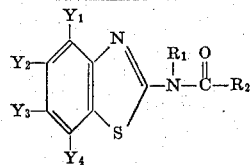

(I)

in which $Y_1$, $Y_2$, $Y_3$ and $Y_4$ each represent a hydrogen or halogen atom, an alkyl, alkoxy, alkylthio, carboxyl, carboxyalkyl, nitrile, thiocyanato, nitro, sulphonic acid, sulphonic acid amide, monoalkylsulphonic acid amide, dialkylsulphonic acid amide or optionally substituted phenyl residue, $R_1$ represents a hydrogen atom or an alkyl residue, $R_2$ represents the group $—OR_3$, $—NH—R_4$ or $—N(R_4)(R_5)$, $R_3$ represents an alkyl, alkenyl, alkinyl or optionally substituted phenyl residue, $R_4$ represents a hydrogen atom or an alkyl residue, $R_5$ represents an alkyl, cycloalkyl, alkenyl, alkinyl, alkoxy or optionally substituted phenyl residue and $R_4$ and $R_5$ together with the N-atom to which they are linked form a 3-membered to 7-membered heterocyclic ring, with the proviso that if $R_4$ represents a methyl residue, one of the substituents, $Y_1$, $Y_2$, $Y_3$ and $Y_4$ is other than a hydrogen atom, optionally together with a liquid or solid carrier or other additive.

The alkyl, alkenyl, alkinyl, alkoxy or alkylthio residues which $Y_1$ to $Y_4$, $R_1$, $R_3$, $R_4$ and $R_5$ may represent, contain one to 18 or two to 18 (in the case of the alkenyl or alkinyl residues), but preferably one to four or two to four carbon atoms. These residues may be branched or straight-chain, unsubstituted or substituted. The cycloalkyls preferably contain three to six carbon atoms in the ring.

As halogen atoms there may be mentioned F, Cl, Br and I atoms. Possible $C_{1-4}$ alkyl, $C_{2-4}$ alkenyl and $C_{2-4}$ alkinyl residues are preferably, for example, methyl, trifluoromethyl, ethyl, propyl, isopropyl, n-, i-, sec.- or tert.-butyl, allyl, methylallyl, chlorallyl, methylpropenyl, propinyl or iso-butinyl residues.

The substituents on the alkyl, alkenyl, alkinyl, alkylene, alkoxy, alkylthio and phenyl residues may be of the first order or of the second order. By substituents of the first order there are here to be understood electron donors which increase the basicity. Here possible groups are, amongst others: halogen atoms such as fluorine, chlorine, bromine, or iodine atoms, alkoxy and alkylthio groups with one to four carbon atoms which may be branched or unbranched, but preferably are unbranched and possess one to two carbon atoms, lower alkoxyalkylene groups of the definitions given above, primary, secondary and especially tertiary amino groups, with lower alkyl and alkanol groups being preferred substituents, hydroxyl and mercapto groups. The phenyl residues can also be substituted by alkyl, monohalogenalkyl and dihalogenalkyl groups of the definitions given above. By substituents of the second order, acidifying electron acceptors are to be understood. Here the following groups are possible, amongst others: nitroso, nitro and nitrile groups, trihalogenalkyl groups, wherein halogen preferably represents F or Cl, lower alkylsulphinyl groups and lower alkylsulphonyl groups which possess a branched or unbranched alkyl residue with one to four carbon atoms, preferably an unbranched alkyl residue with one or two carbon atoms.

Compounds of special importance are those of formula

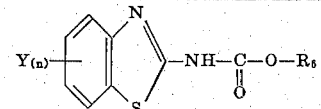

(II)

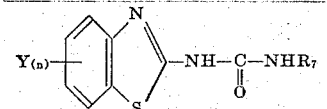

(III)

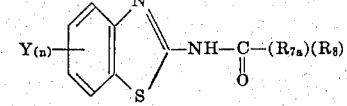

(IV)

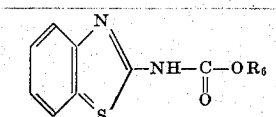

(V)

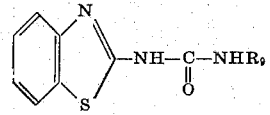

(VI)

In formulae II to VI Y represents a number, defined by n, of identical or different halogen atoms, $C_{1-4}$ alkyl, $C_{1-4}$ alkoxy, $C_{1-4}$ alkylthio, carboxy $C_{1-4}$ alkyl or nitro groups, n is an integer of 1 to 4, $R_6$ represents a $C_{1-4}$ alkyl, $C_{2-4}$ alkenyl or optionally substituted phenyl residue, $R_{7a}$ and $R_8$ each represents a $C_{1-18}$ alkyl residue or a 3-membered to 6-membered cycloalkyl residue, $R_9$ represents a $C_{2-18}$ alkyl residue or an optionally substituted phenyl residue.

As examples of suitable compounds of formulae I to VI, the following may be quoted:

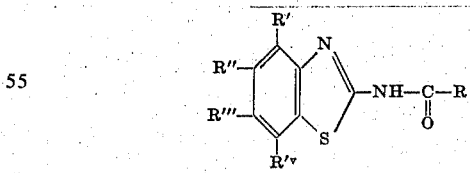

| R | R' | R'' | R''' | R'ᵛ |
|---|---|---|---|---|
| —NH—CH$_2$OCH$_3$ | H | H | H | H |
| —NH—CH$_2$—CNS | H | H | H | H |
| —NH—CH(OCH$_3$)(OCH$_3$) | H | H | H | H |

| R | R' | R'' | R''' | R'ᵛ |
|---|---|---|---|---|
| —NH—CH(OCH₃)(CH₃) | H | H | H | H |
| —NH—CH₂OCH₃ | Cl | H | H | H |
| —NHCH₂—CHS | Cl | H | H | H |
| —NH—CH(OCH₃)(OCH₃) | Cl | H | H | H |
| —NH—CH(OCH₃)(CH₃) | Cl | H | H | H |
| —NH—CH₂OCH₃ | H | H | OCH₃ | H |
| —NH—CH₂—CNS | H | H | OCH₃ | H |
| —NH—CH(OCH₃)(OCH₃) | H | H | OCH₃ | H |
| —NH—CH(OCH₃)(CH₃) | H | H | OCH₃ | H |
| —NH—CH₂OCH₃ | H | H | OC₂H₅ | H |
| —NH—CH₂—CNS | H | H | OC₂H₅ | H |
| —NH—CH(OCH₃)(OCH₃) | H | H | OC₂H₅ | H |
| —NH—CH(OCH₃)(CH₃) | H | H | OC₂H₅ | H |
| —NH—CH₂—CH₂OCH₃ | H | H | H | H |
| —NH—CH₂—CHOCH₃ | H | H | OCH₃ | H |
| —NH—CH₂CH₂OCH₃ | H | H | OC₂H₅ | H |
| —NH—CH₂CH₂OCH₃ | Cl | H | H | H |
| —NH—CH₂CH₂OC₂H₅ | H | H | OCH₃ | H |
| —NH—CH₂CH₂OC₂H₅ | H | H | OC₂H₅ | H |
| —NH—CH₂CH₂OC₂H₅ | Cl | H | H | H |
| —NH—CH(OCH₃)(OCH₃) | H | H | OC₂H₅ | H |
| —NH—CH₂—CNS | H | H | OC₂H₅ | H |
| —NH—CH₂—CH₂—CNS | Cl | H | H | H |
| —NH—CH₂—CH₂—CNS | H | H | OCH₃ | H |
| —NH—CH₂—CH₂—CNS | H | H | OC₂H₅ | H |
| —NH—CH₂OCH₃ | H | H | OC₂H₅ | H |
| —NH—CH₂CNO | Cl | H | H | H |
| —NH—CH₂CNO | H | H | OC₂H₅ | H |
| —NH—CH₂CNO | H | H | H | H |
| —NH—CH₂CNO | H | H | OCH₃ | H |

The present invention also provides the phenylureas of formulae I to VI. They may be manufactured according to methods which are in themselves known, for example by reaction of an aromatic residue

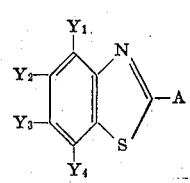

with a second reagent B, so that $Y_1$ to $Y_4$ have the meanings given for formula I, whilst one of the substituents A or B represents an amine component

in which one or both free valencies are bonded to H, to the extent that they are not constituents of a primary or secondary amine, whilst the other represents the grouping

or —N=C=O, wherein R' can be an easily removable residue which contains C or A represents —NH₂ or —NHR' and B represent the grouping ClCOOR₃, wherein R₃ has the meaning given for formula I.

The compounds of formula I can preferably be manufactured:

a. By reaction of an aromatic residue

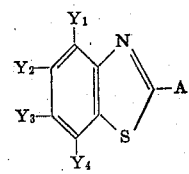

with a primary or secondary amine of formulae

HNR₅, which both together can form the urea grouping, so that therein $Y_1$ to $Y_4$, $R_4$ and $R_5$ have the meanings given for formula I, whilst A represents the grouping

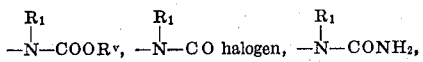

or — N = C = O, $R^v$ = alkyl or aryl, and $R_1$ has the meaning given for formula I.

b. By reaction of an amine of formula

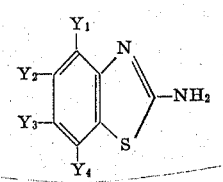

with one of the compounds of formulae

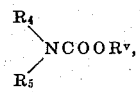

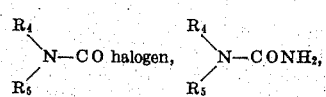

$R_5$ N = C = O, $R^v$ = aryl. Herein $Y_1$ to $Y_4$, $R_4$ and $R_5$ have the meanings given for formula I.

c. By reaction of an amine of formula

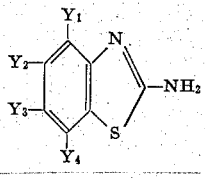

with a compound of formula

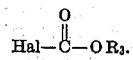

Here $Y_1$ to $Y_4$ and $R_3$ have the meanings given for formula I and Hal represents an F, Cl, Br or I atom.

The manufacture of the basic 2-aminobenzthiazoles is known and is described in summary in R. C. Elderfield "Heterocyclic compounds," volume 5.

The compounds of formula I possess a good microbiocidal action against bacteria and fungi, especially against plant-pathogenic fungi such as, for example, Erysiphe cichoracearum DC., Alternaria tenius or solani, Uromyces phaseoli Pers. Piricularia oryzae Bri. et Cav. and Botrytis cinerea Pers. The invention relates to the use of the compounds of formula I as active ingredients in microbiocidal preparations.

The preparations according to the invention contain, in addition to the active ingredient of formula I, a suitable carrier and/or other additives. Suitable carriers and additives can be solid or liquid and correspond to the substances which are usual in formulation technology such as, for example, natural or regenerated mineral substances, solvents, diluents, dispersing agents, emulsifiers, wetting agents, adhesives, thickeners, binders or fertilisers. Furthermore, yet further biocidal compounds can be added. Such biocidal compounds can, for example, belong to the class of the ureas, the saturated or unsaturated halogenobenzonitriles, halogenobenzoic acids, phenoxyalkylcarboxylic acids, carbamates, triazines, nitroalkylphenols, organic phosphoric acid compounds, quaternary ammonium salts, sulphamic acids, arsenates, arsenites, borates or chlorates. Thus, there are numerous use forms for the new active substances, and these forms will be dealt with in more detail below: possible materials for the manufacture of directly sprayable solutions of the compounds of general formula I are, for example, mineral oil fractions of high to medium boiling range, such as diesel oil or kerosene, coal tar oils and oils of vegetable or animal origin, as well as hydrocarbons such as alkylated naphthalenes, tetrahydronaphthalene, xylenes, cyclohexanol, ketone and also chlorinated hydrocarbons such as trichlorethane and tetrachlorethane, trichlorethylene or trichlorobenzenes and tetrachlorobenzenes, individually or in mutual combination. Solvents of which the boiling point lies above 100°C are advantageously used.

Aqueous application forms are especially appropriately prepared from emulsion concentrates, pastes or wettable spraying powders by adding water. Possible emulsifiers or dispersing agents are non-ionic products, for example, condensation products of aliphatic alcohols, amines or carboxylic acids having a long-chain hydrocarbon residue of about 10 to 20 carbon atoms with ethylene oxide, such as the condensation product of octadecylalcohol and 25 to 30 mols of ethylene oxide, or that of soya fatty acid and 30 mols of ethylene oxide or that of technical oleylamine and 15 mols of ethylene oxide or that of dodecylmercaptan and 12 mols of ethylene oxide. Amongst the anionic emulsifiers which can be employed there may be mentioned: the sodium salt of dodecyl alcohol sulphuric acid ester, the sodium salt of dodecylbenzenesulphonic acid, the potassium or triethanolamine salt of oleic acid or of abietic acid or of mixtures of these acids or the sodium salt of a petroleum sulphonic acid. Possible cationic dispersing agents are quaternary ammonium compounds such as cetylpyridinium bromide, or dihydroxyethylbenzyl-dodecylammonium chloride.

In order to manufacture dusting agents and scattering agents, it is possible to employ talc, kaolin, bentonite, calcium carbonate, calcium phosphate, but also charcoal, cork powder, wood flour and other materials of vegetable origin as solid carriers. It is also very appropriate to manufacture the preparations in a granular form. The various use forms can be provided in the usual manner with additions of substances which improve the distribution, adhesion, rain resistance or penetrating power; as such substances there may be mentioned: fatty acids, resins, glue, casein or alginates.

In many cases the use of granules for the uniform release of active substances over a longer period of time is of advantage. These granules can be manufactured by dissolving the active substance in an organic solvent, absorbing this solution by means of a granular material, for example, attapulgite or $SiO_2$, and removing the solvent. They can also be manufactured by mixing the active substances of formula I with polymerisable compounds, after which a polymerisation is carried out which leaves the active substances unaffected, with the granulation being carried out whilst the polymerisation is still proceeding. The content of active substance in the agents described above is between 0.01 and 95 percent and it should be mentioned in this context that on application from aircraft or by means of other suitable application equipment concentrations of up to 99.5 percent or even pure active substance are employed.

The following Examples illustrate the invention:

EXAMPLE 1

Manufacture of the compound of formula

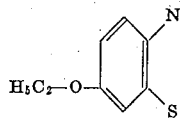 —NH—CO—NH—CH₃    Compound No. 1

58.2 g (0.3 mol) of 2-amino-6-ethoxybenzthiazole are suspended in 450 ml of dry benzene and heated to 80°C, whereupon the substance dissolves. 20 ml of methylisocyanate are added dropwise to this temperature. After about 12 ml of methylisocyanate have been added dropwise, a precipitate begins to separate out. Thereafter the mixture is stirred for a further 2 hours at 80°C and then cooled to 5°C, and the product is filtered off. This is immediately obtained in an analytically pure form. Melting point: 222°–224°C. Yield: 73 g = 97 %.

EXAMPLE 2

Manufacture of the compound of formula

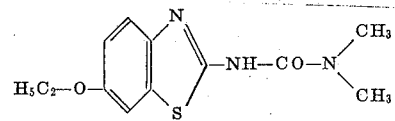

Compound No. 2

Sixty ml of pyridine are cooled to 5°C and mixed dropwise with 32.5 g of dimethylcarbamic acid chloride. 58.2 g of 2-amino-6-ethoxybenzthiazole are added to this mixture, initially kept at 5°C, whilst stirring, with care having to be taken that the temperature does not exceed 50°C. Thereafter the reaction mixture is kept for 2 hours at 50°C. It is then cooled to room temperature whilst stirring and mixed with 500 ml of water, and the product which has precipitated is filtered off. Melting point: 173°–175°C. Yield: 75 g = 93.5 percent.

The following compounds were manufactured analogously:

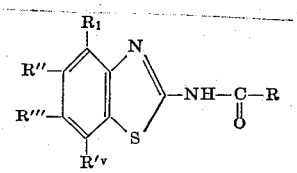

| Compound number | R | R' | R'' | R''' | R'ᵥ | Melting point (° C.) |
|---|---|---|---|---|---|---|
| 3 | —NH-n(C₃H₇) | H | H | H | H | 145–47 |
| 4 | —NH-i(C₃H₇) | H | H | H | H | 180–182 |
| 5 | —NH-n(C₄H₉) | H | H | H | H | 132–33 |
| 6 | —NH-n(C₁₈H₃₇) | H | H | H | H | 80–85 |
| 7 | —NH-n(C₁₂H₂₅) | H | H | H | H | 100–102 |
| 8 | —NH-n(C₈H₁₇) | H | H | H | H | 97–99 |
| 9 | —NH—C₆H₁₁ | H | H | H | H | 185–87 |
| 10 | —NHC₂H₅ | —OCH₃ | H | H | H | 145–48 |
| 11 | —NHC₂H₅ | —OCH₃ | H | H | Cl | 183–85 |
| 12 | —NHC₂H₅ | Cl | H | H | H | 249–52 |
| 13 | —NHC₂H₅ | —OC₂H₅ | H | H | H | 179–81 |
| 14 | —NHC₂H₅ | H | H | Cl | H | <260 |
| 15 | —NHC₂H₅ | H | H | —OCH₃ | H | <300 |
| 16 | —NHCH₃ | —OCH₃ | H | H | —CH₃ | 220–24 |
| 17 | —NHCH₃ | —OCH₃ | H | H | H | 201–3 |
| 18 | —NHCH₃ | —OC₂H₅ | H | H | H | 243–47 |
| 19 | —NHCH₃ | —CH₃ | H | H | Cl | ᵃ 275 |
| 20 | —NHCH₃ | —OC₂H₅ | H | H | —OC₂H₅ | 200–202 |
| 21 | —NHCH₃ | —OC₂H₅ | H | H | Cl | ᵃ 248–50 |
| 22 | —NHCH₃ | —Cl | H | H | H | ᵃ 255 |
| 23 | —NHCH₃ | —CH₃ | H | H | —CH₃ | ᵃ 25₇ |
| 24 | —NHCH₃ | H | H | —C(O)—OC₂H₅ | H | 256–60 |
| 25 | —NHCH₃ | H | H | —OCH₃ | H | 297–298 |
| 26 | —NHCH₃ | H | H | Cl | H | <270 |
| 27 | —NHCH₃ | H | H | —OC₂H₅ | H | 222–24 |
| 28 | —NHCH₃ | H | H | —CH₃ | H | 270–75 |
| 29 | —NH-n(C₃H₇) | H | —CH₃ | H | —NO₂ | 209–12 |
| 30 | —NH-n(C₃H₇) | —OC₂H₅ | H | H | —OC₂H₅ | 156–58 |
| 31 | —NH-n(C₃H₇) | H | H | —C(O)—OC₂H₅ | H | 181–83 |
| 32 | —NH-n(C₃H₇) | —OCH₃ | H | H | —CH₃ | 171–73 |
| 33 | —NH-n(C₃H₇) | —OCH₃ | H | H | H | 80–85 |
| 34 | —NH-n(C₃H₇) | —OCH₃ | H | H | Cl | 165–68 |
| 35 | —NH-n(C₃H₇) | H | H | —OCH₃ | H | 163–65 |
| 36 | —NH-n(C₃H₇) | —Cl | H | H | H | 198–99 |
| 37 | —NH-n(C₃H₇) | OC₂H₅ | H | H | H | 169–71 |
| 38 | —NH-n(C₃H₇) | H | H | —OC₂H₅ | H | 166–67 |
| 39 | —NH-i(C₃H₇) | H | H | —OC₂H₅ | H | 180–84 |
| 40 | —N(CH₃)₂ | H | H | —OCH₃ | H | 210–215 |
| 41 | —N(CH₃)₂ | H | H | —SCH₃ | H | 105–107 |
| 42 | —N(CH₃)₂ | H | H | Cl | H | ᵃ 210 |
| 43 | —N(CH₃)₂ | H | H | CH₃ | H | 181 |
| 44 | —N(CH₃)₂ | H | H | —OC₂H₅ | H | 173–75 |

ᵃ Decomposition.

EXAMPLE 3

Manufacture of the compound of formula

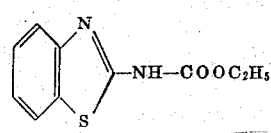

Compound No. 45

45.6 g [0.3 mol] of 2-amino-benzthiazole are dissolved in 450 ml of dry ethyl acetate and mixed with 24 ml of dry pyridine. 36 g of chloroformic acid ethyl ester are added dropwise at room temperature. The mixture is finally stirred overnight, and the organic phase is washed in a separating funnel with water, sodium bicarbonate solution and saturated sodium chloride solution until neutral, dried over sodium sulphate and evaporated to dryness under reduced pressure. Melting point 198°–200°C (from alcohol); yield: 62 g = 91%.

The following compounds of general formula

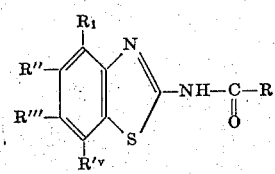

are manufactured analogously.

| Compound Number | R | R' | R'' | R''' | R'ᵥ | Melting point (° C.) |
|---|---|---|---|---|---|---|
| 46 | —O—⟨phenyl⟩ | H | H | —OC₂H₅ | H | ᵃ 237 |
| 47 | —O—⟨phenyl⟩ | H | H | H | H | 195–97 |
| 48 | —OCH(CH₃)CH₃ | H | H | H | H | 185–87 |
| 49 | —OC₄H₉—n | H | H | H | H | 158–60 |
| 50 | —OCH₂—CH≡CH₂ | H | H | H | H | 183–85 |
| 51 | —O—CH₂—CH(CH₃)CH₃ | H | H | H | H | 176–78 |
| 52 | —O—CH₂—CH₂—Br | H | H | H | H | 216–18 |
| 53 | —OCH₃ | H | H | —OC₂H₅ | H | 230–32 |
| 54 | —OCH₃ | H | H | —Cl | H | 299 |
| 55 | —OCH₃ | H | H | H | H | ᵃ 210 |
| 56 | —OC₂H₅ | H | H | —OC₂H₅ | H | 193–95 |

ᵃ Decomposition.

EXAMPLE 4

Dusting Agents

Equal parts of an active ingredient of the invention and precipitated silica are finely ground. Dusting agents preferably containing 1 to 6 percent of active ingredient can be manufactured therefrom by mixing with kaolin or talc.

Spraying Powders

In order to manufacture a spraying powder, the following components are, for example, mixed and finely ground:

| | |
|---|---|
| 50 | parts of an active ingredient of the present invention |
| 20 | parts of HISIL (highly adsorbent silica) |
| 25 | parts of Bolus alba (kaolin) |
| 1.5 | parts of sodium 1-benzyl-2-stearyl-benzimidazole-6,3'-disulphonate |
| 3.5 | parts of a reaction product of p-tert. octylphenol and ethylene oxide. |

Emulsion Concentrate

Easily soluble active substances can also be formulated as an emulsion concentrate in accordance with the following instruction:

| | |
|---|---|
| 20 | parts of active substance |
| 70 | parts of xylene and |
| 10 | parts of a mixture of a reaction product of an alkylphenol with ethylene oxide and calcium dodecylbenzenesulphonate | are mixed. On dilution with water to the desired concentration, a sprayable emulsion is produced.

Granules 7.5 g of one of the active ingredients of formula I are dissolved in 100 ml of acetone and the acetone solution thus obtained is applied to 92 g of granulated attapulgite (mesh size: 24/48 meshes/inch). The whole is well mixed and the solvent is stripped off in a rotational evaporator. A granular material containing 7.5 percent of active ingredient is obtained.

EXAMPLE 5

Fungicidal Test a. Cucumber mildew (Erysiphe cichoracearum D.G.)

Cucumber plants were grown in a greenhouse and sprayed once prophylactically with aqueous spraying broths each containing 0.1 percent of the test active substances. Two days thereafter the plants treated in this way were infected with spores of Erysiphe cichoriacearum DC. After 12 to 14 days subsequent incubation in the greenhouse, the treated plants were examined for fungal attack.

| Active Substance No. | Results % Fungal Attack |
|---|---|
| 3 | 0 |
| 4 | 20 |
| 12 | 0 |
| 22 | 0 |
| 36 | 0 |
| 55 | 0 |

The untreated control pants were 100 % attacked by fungi.

b. Bean rust (Uromyces phaseoli)

Bean plants were grown in a greenhouse and sprayed once prophylactically with aqueous spraying broths each containing 0.1 percent of the test active substances. Two days thereafter the plants treated in this way were infected with uredospores of *Uromyces phaseoli* (Pers.) Wint. and introduced into a humidity chamber for 2 days. After 10 to 14 days subsequent incubation in the greenhouse, the treated plants were examined for fungal attack.

| Results Active Substance No. | % Fungal Attack |
|---|---|
| 5 | 10 |
| 35 | 0 |
| 40 | 0 |

The untreated control plants were 100 % attacked by fungi.

c. Grey rot (Botrytis cinerea Pers.)

Freshly cut vine leaves of the Riesling and Sylvaner variety are sprayed with aqueous broths each containing 0.1 percent of the test active ingredients. After drying the spray deposit, the leaves are infected with an aqueous conidia suspension of Botrytis cinerea Pers. and incubated in a humidity dish. After 4 days the treated vine leaves are examined for fungal attack.

| Results Active Substance No. | % Fungal Attack |
|---|---|
| 31 | 0 |
| 45 | 0 |
| 48 | 0 |

The untreated leaves were 100 percent attacked by fungi.

I claim:

1. A method for controlling phytopathogenic fungi which comprises applying to an area infested with said fungi, a fungicidally effective amount of a compound of the formula

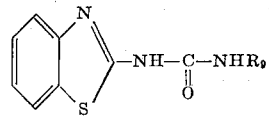

wherein $R_9$ is $C_3$ alkyl.

2. The method of claim 1 wherein $R_9$ is n-propyl.
3. The method of claim 1 wherein $R_9$ is isopropyl.
4. A fungicidal composition comprising (1) a fungicidally effective amount of a compound of the formula

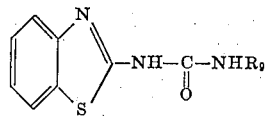

wherein $R_9$ is $C_3$ alkyl, and (2) a suitable carrier.

* * * * *